(12) United States Patent
Herring et al.

(10) Patent No.: US 7,134,465 B2
(45) Date of Patent: Nov. 14, 2006

(54) PROCESS AND APPARATUS FOR IDENTIFYING, TRACKING AND HANDLING LUMBER TO BE CUT-IN-TWO

(75) Inventors: Richard Herring, Salmon Arm (CA); Vince Vanlderstine, Salmon Arm (CA)

(73) Assignee: COE Newnes/McGehee Inc., Salmon Arm (CA)

( * ) Notice: Subject to any disclaimer, the term of this patent is extended or adjusted under 35 U.S.C. 154(b) by 220 days.

(21) Appl. No.: 10/965,812

(22) Filed: Oct. 18, 2004

(65) Prior Publication Data

US 2005/0081957 A1 Apr. 21, 2005

Related U.S. Application Data

(60) Provisional application No. 60/511,316, filed on Oct. 16, 2003.

(51) Int. Cl.
*B27B 31/06* (2006.01)
*G01B 11/04* (2006.01)

(52) U.S. Cl. .................... 144/394; 144/3.1; 198/459.5; 83/367

(58) Field of Classification Search ............ 198/459.5, 198/459.6, 463.4; 414/222.02; 144/394, 144/376, 379, 392, 402, 430, 378, 357, 356, 144/382, 404, 2.1, 3.1, 250.25, 242.1, 245.4; 83/63, 419, 361, 362, 367; 700/114, 167, 700/171
See application file for complete search history.

(56) References Cited

U.S. PATENT DOCUMENTS

| | | | |
|---|---|---|---|
| 3,811,353 A | 5/1974 | Miles | |
| 3,923,142 A * | 12/1975 | Rysti | 198/461.2 |
| 4,392,204 A | 7/1983 | Prim et al. | |
| 4,638,440 A | 1/1987 | Brough et al. | |
| 4,869,360 A | 9/1989 | Brown et al. | |
| 4,887,219 A | 12/1989 | Strauser | |
| 5,099,896 A | 3/1992 | Ritola | |
| 5,142,955 A | 9/1992 | Hale | |
| 5,419,425 A * | 5/1995 | Goater | 198/463.4 |
| 5,518,106 A * | 5/1996 | Allard | 198/459.5 |
| 5,617,910 A * | 4/1997 | Hill | 144/356 |
| 5,662,203 A * | 9/1997 | St-Pierre et al. | 198/463.5 |
| 5,813,512 A * | 9/1998 | Andersson et al. | 198/459.5 |
| 6,199,683 B1 * | 3/2001 | Michell et al. | 198/459.5 |
| 6,431,345 B1 * | 8/2002 | Burgener et al. | 198/459.5 |
| 6,539,830 B1 | 4/2003 | Koskovich | |
| 6,564,926 B1 * | 5/2003 | Dube et al. | 198/459.5 |

(Continued)

*Primary Examiner*—Stephen Choi
(74) *Attorney, Agent, or Firm*—Anthony C. Edwards

(57) ABSTRACT

An apparatus for identifying, tracking and handling lumber to be cut-in-two includes a scanner and optimizer to scan the length of a board and to compare the scanned board to predetermined criteria so as to identify a board which, optimally, would be cut into two pieces along its length. An identification device applies a detectable indicator to the board. A transfer transfers in a downstream direction, the board from the scanner to the identification device, and from the identification device to a lug-loader loading device adjacent and immediately upstream of a lug loader. A detector cooperates with the lug-loader loading device so as to detect the detectable indicator on the board and to delay the loading of the lug loader following loading of the board into a lug space so that an immediately subsequent lug space behind and upstream of the board is left empty so as to receive a portion of the board cut from the board once the board is cut-in-two in a downstream trimmer or other sawing device.

4 Claims, 3 Drawing Sheets

U.S. PATENT DOCUMENTS 6,702,096 B1    3/2004  Koskovich et al.
7,004,303 B1 *  2/2006  Rennie et al. ........... 198/459.5

2003/0183052 A1  10/2003  Olsen
2004/0025654 A1   2/2004  Olsen

* cited by examiner

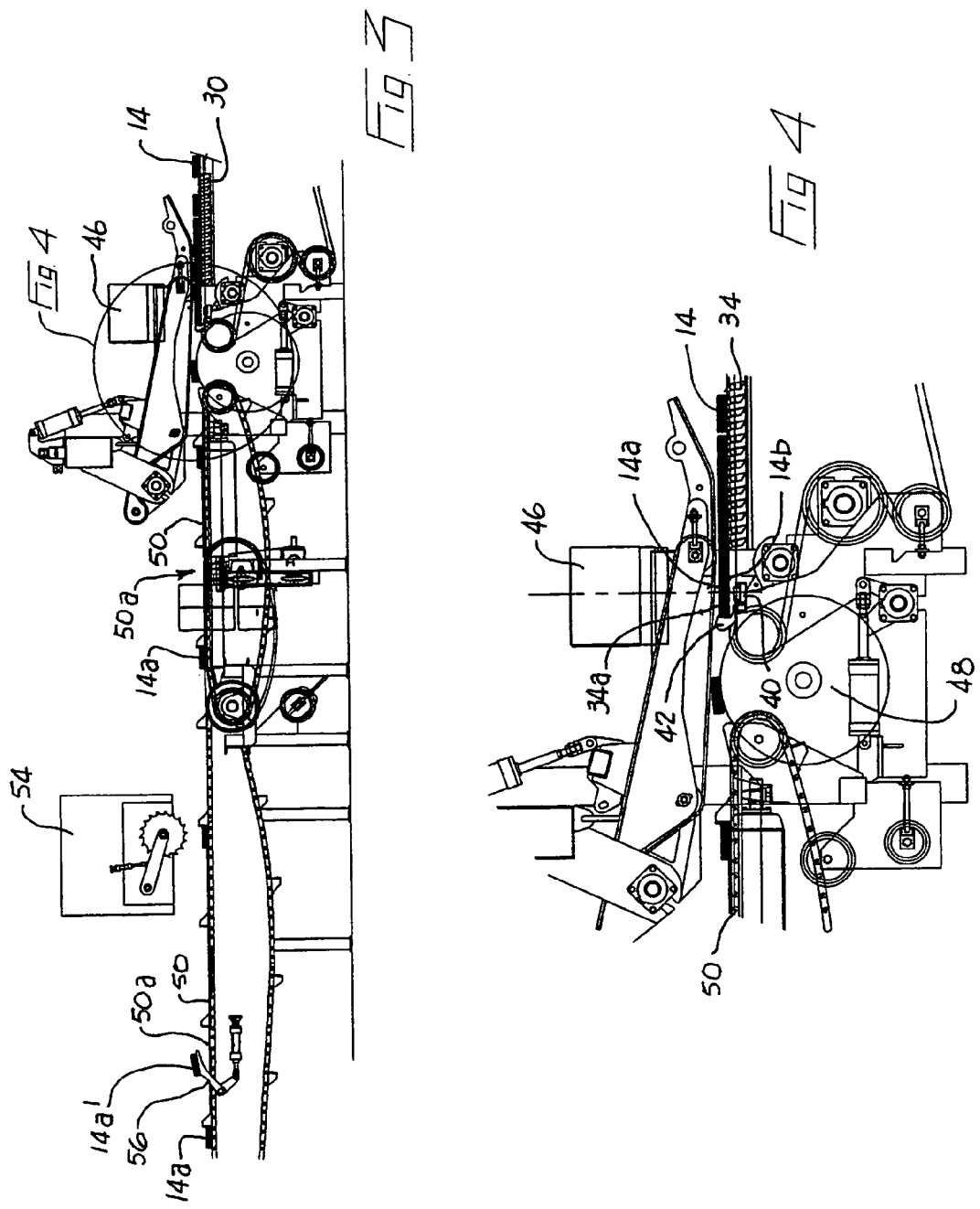

PROCESS AND APPARATUS FOR IDENTIFYING, TRACKING AND HANDLING LUMBER TO BE CUT-IN-TWO

CROSS REFERENCE TO RELATED APPLICATION

This application claims priority from U.S. Provisional Patent Application No. 60/511,316 filed Oct. 16, 2003 entitled A Process and Apparatus for Identifying, Tracking and Handling Lumber To Be Cut-In-Two.

FIELD OF THE INVENTION

This invention relates to an automated process whereby planed lumber is scanned in a scanner for conformity with predetermined parameters for a cut-in-two solution. Pieces so identified are later marked as they pass through a marking station activated by a delayed signal from the scanner and identified further downstream by sensors which regulate the placement of individual boards onto lugged transfer chains so as to leave an unoccupied lug space immediately behind the marked board prior to entering a trim saw, thereby providing a lug space for a piece cut from the marked board when cut-in-two in the trimmer.

BACKGROUND OF THE INVENTION

Previously, a preferred method of processing longer boards identified as having greater value when cut into two pieces in the planermill was to utilize a "skip-a-lug" system. Generally, this process utilized a separate outgoing transfer section downstream of the lug loader. This enabled a board located immediately behind the board identified as a piece to be cut-in-two piece to be momentarily held back at the transfer transition, to thereby create an empty lug space. This conventionally required additional floor space in the mill, which may not be available in some installations, and it also added significant cost to a system and further induced rapid acceleration and deceleration in the affected transfers, which could lead to material handling problems.

The linear planermill scanning system according to one aspect of the present invention permits determination of a cut-in-two solution for any board meeting the criteria of that solution prior to the board arriving at the lug loader, thereby creating the opportunity to identify the piece as a piece to be "cut-in-two", and perform a lug inhibit operation.

It is an object of the present invention to provide an efficient linear planermill layout which occupies a minimum footprint, which permits marking and identification of boards meeting a predetermined cut-in-two criteria and which permits a delayed passage of the board immediately following of the marked board on to a separate outgoing transfer section.

It is an object of this invention to provide a process whereby boards that are scanned and identified as having a greater value when cut into two pieces signals are marked by a device which applies an identification mark to one of the pieces of the board.

It is also an object to provide an optical identification mark recognition device such as a camera fixedly positioned near the terminal end of a backlog table to recognise the marked board.

It is also an object to provide a holdback hook or ducker arm positioned beneath a terminal end of a backlog table and which is activated to delay passage of the board immediately rearwardly of the marked board so that a transfer chain transporting the marked board may be sufficiently advanced that a clear lug space is created immediately behind the marked board before a following board is released.

SUMMARY OF THE INVENTION

The present invention is a process for identifying randomly produced long boards which will have a higher value when cut into two pieces, and ultimately permitting an alternative product configuration for such long boards.

Such boards are normally produced within the lumber stream for processing by a planer. From the planer an infeed bridge transfers the boards to a scanner/optimizer system such as the Linear High Grade Optimizer™ manufactured by Coe Newnes/McGehee ULC, where they are scanned for conformity with predetermined parameters for a cut-in-two solution. This solution decision takes a short time interval to complete. During this interval the board is carried to a marking station. Boards that are so identified as meeting the threshold requirements of a predetermined optimized cut-in-two solution trigger a signal from the optimizer to the marking station which results in a visual identification mark being applied to the long board. The position of the mark on the board is relative to the zero line of the board, thus the mark is placed at the same position on every marked board, that is, on every board meeting the criteria for a cut-in-two solution.

All boards pass along a smooth surfaced slowdown belt, landing table, and backlog table. An optical identification mark recognition device such as a camera is mounted near the end of the backlog table at the lug loader ducker position at a distance from the zero lumber line to correspond to the position of the identifying mark on the board. Such device may be positioned above, below, or both above and below the backlog table and detect boards which contain an identification mark and thus require cutting in two. A sensor positioned beneath the backlog table senses the presence of a board at the terminal, that is downstream edge, of the backlog table. That board is held by a holdback hook or ducker arm also positioned beneath the backlog table at its terminal end. A lug loader passes boards from a mat or tier of boards on the backlog table on to a lugged transfer which carries the boards to trim saws further downstream.

Boards to be cut-in-two, that is boards which have been identified as meeting the predetermined parameters for a cut-in two solution are cut into two pieces by the downstream trimsaws. An unoccupied lug space must be left on the lugged transfer immediately behind a "to be cut-in-two" board so as to receive the cut portion from that board once cut. In one embodiment an elevating station is provide so that one portion of the cut board is raised, held generally stationary and then dropped into the following lug space, that is the empty lug space on the transfer.

An unoccupied lug space on the lugged transfer immediately behind the board that has been identified for cut in two, results from the following steps:

a) the lug loader photo eye sensor detects the presence of a board at the terminal edge of the backlog table;

b) the holdback hook or Ducker Arm is activated to stop the detected board;

c) the optical identification mark recognition device views the marked board and, upon recognition of the identification mark the holdback hook is actuated to feed the board from the backlog table, onto the lug loader, and into a lug space on the lugged transfer chain; and, d) the following board, whether identified as a cut-in-two board or not, is delayed in passage from the backlog table to the lug loader by the holdback hook until the lugged transfer chain has advanced sufficiently to create a free, that is empty, lug space on the lugged transfer chain immediately behind the marked board.

In summary, the apparatus of the present invention includes, in one embodiment, the following:

a) scanning and optimization means to scan the length of a board and to compare the scanned board to predetermined criteria so as to identify a board which, optimally, would be cut into two pieces along its length,
b) identification means for applying detectable indicator to the board,
c) transfer means for transferring, in a downstream direction, the board from the scanning and optimization means to the identification means, and from the identification means to a lug-loader loading device adjacent and immediately upstream of a lug loader,
d) detector means cooperating with the lug-loader loading device so as to detect the detectable indicator on the board and to delay the loading of the lug loader following loading of the board into a lug space so that an immediately subsequent lug space behind and upstream of the board is left empty so as to receive a portion of the board cut from the board once the board is cut-in-two in a downstream trimmer or other sawing means.

Translation and pre-positioning means align the board for an optimized cut-in-two. A trimmer or other sawing means cuts the board according to the optimized cut-in-two solution. The board then translates downstream as two longitudinally aligned pieces or portions separated by, for example, the kerf width of the cut. A board lifter is then actuated to lift one of the pieces or portions of the board, simultaneously slowing the downstream translation of the lifted piece or portion until the next, that is next upstream, lug on the lugged transfer passes under the lifted piece or portion, following which the lifted piece or portion is lowered into the empty lug space.

The process according to the present invention includes the steps of accomplishing the above including the scanning and optimization and identification of the board, the applying of the detectable indicator (such as paint) to the board, the transferring downstream of the board, the detecting of the detectable indicator, and the delaying of the loading of the lug loader following such detection so as to leave an empty lug space behind the identified board.

BRIEF DESCRIPTION OF THE DRAWINGS

FIGS. 3 and 4 are an enlarged side elevation of a portion of the planer mill generally viewed in the direction 3—3 of FIG. 1.

DETAILED DESCRIPTION OF EMBODIMENTS OF THE INVENTION

Figure 1:
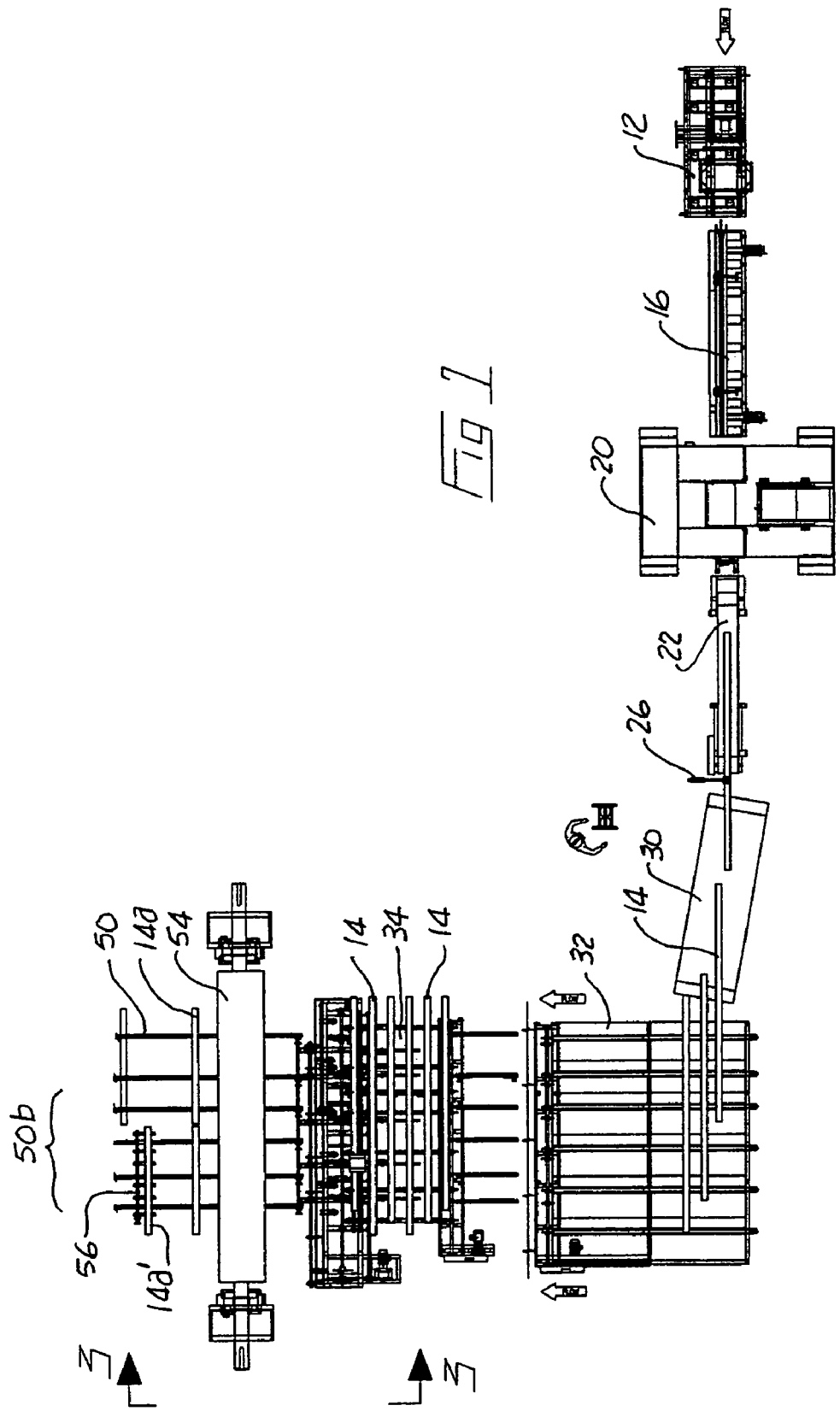
FIG. 1, is a plan view of a linear planer mill according to the present invention.
Figure 2:
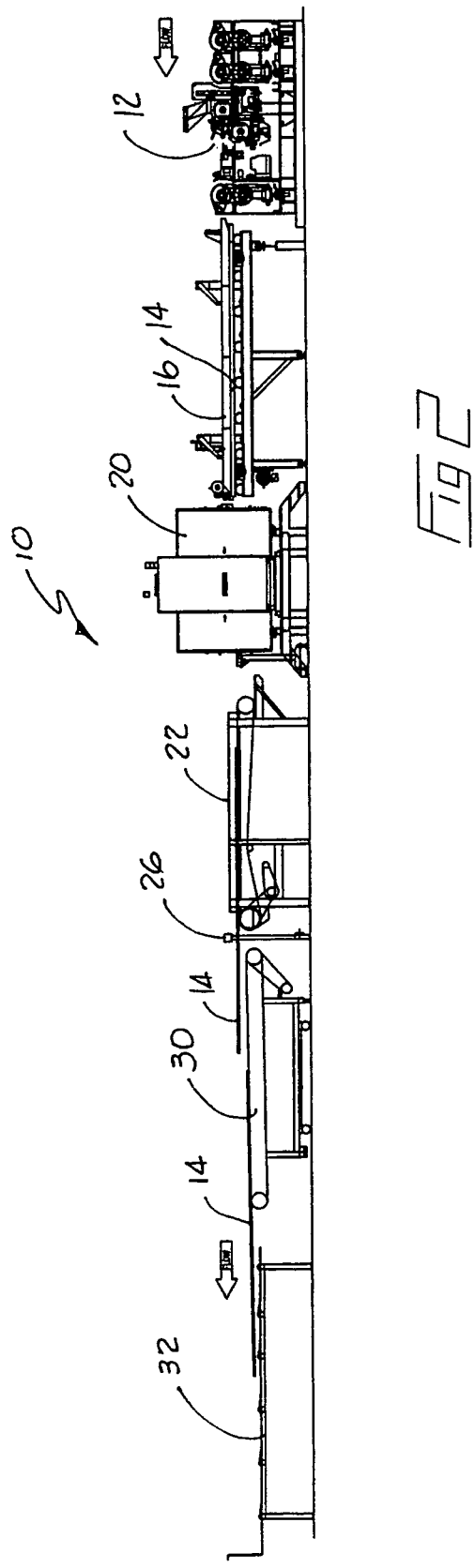
FIG. 2 is a side elevation of a portion of the mill illustrated in FIG. 1.

With reference to the drawing figures, wherein similar characters of reference denote corresponding parts in each view, the linear planer mill 10 generally has a process which commences at its downstream end with a planer 12. Boards 14 are transferred across a infeed bridge 16 to a linear high grade optimizer 20 where they are scanned and identified as either suited or unsuited to a cut-in-two solution. Board 14 passes along outfeed path 22 to a marking station 26. If the board is identified by linear high grade optimizer 20 as meeting a predetermined cut-in-two solution, a signal response from optimizer, activates marking station 26 and a visual identification mark is applied to the long board.

Board 14 passes on to smooth surfaced slowdown belt 30, landing table 32 and backlog table 34. When photo eye sensor 40, positioned beneath the terminal end 34a of backlog table 34 detects the presence of any one of boards 14, a holdback hook or ducker arm 42 is activated, for example raised, to stop the detected board from translating further downstream. Camera 46 scans board 14 and when the identification mark is recognized indicating a board 14a suitable for a cut-in-two solution, ducker arm 42 is actuated, lowered in the case of the ducker arm, to release the board onto the lug loader 48, and the succeeding board 14b whether that board is also identified as meeting a cut-in-to solution or not is momentarily further delayed from passing to lug loader 48, that is actuation of the holdback hook or ducker arm is delayed, until transfer chain 50 has advanced sufficiently to create a free lug space 50a immediately behind the preceding cut-in-two board.

Chain 50 carries board 14a which has identified as being suitable to be cut in two through trim saw 54 where it is trimmed into two. Lift station board lifters 56 are positioned between the chains of transfer chain 50, on one side only, for example side 50b, downstream of saw 54. Lifters 56 elevate one portion, labelled for reference 14a', of the trimmed board 14a above transfer chain 50 and momentarily holds it stationary allowing the vacant lug space 50a to come into alignment beneath elevated board 14a'. Lifters 56 are then lowered so as to lower trimmed portion 14a' into the previously vacant lug space 50a adjacent and upstream of the remaining portion of board 14a.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:
1. An apparatus for identifying, tracking and handling lumber to be cut-in-two, comprising:
   a) scanning and optimization means to scan the length of a board and to compare the scanned board to predetermined criteria so as to identify a board which, optimally, is to be cut into two pieces,
   b) identification means for applying a detectable indicator to the board,
   c) transfer means for transferring, in a downstream direction, the board from said scanning and optimization means to the identification means, and from said identification means to a lug-loader loading device adjacent and immediately upstream of a lug loader,
   d) detector means cooperating with said lug-loader loading device so as to detect said detectable indicator on the board and to delay the loading of the lug loader following loading of the board into a lug space so that an immediately subsequent lug space behind and upstream of the board is left empty on the corresponding lugged transfer so as to receive a portion of the board when cut from the board once the board is cut-in-two in a downstream sawing means.
2. The apparatus of claim 1 further comprising translation and pre-positioning means to align the board for an optimized cut-in-two by said sawing means, wherein said sawing means cuts the board according to an optimized cut-in-two solution, and the board then translates downstream as two longitudinally aligned pieces on said lugged transfer.
3. The apparatus of claim 2 further comprising a board lifter downstream which is actuable to lift one of the pieces of the board, so as to simultaneously slow the downstream translation of the lifted piece until the next upstream lug on said lugged transfer passes under the lifted piece following which the lifted piece is lowered into said empty lug space.
4. The apparatus of claim 1 wherein said detectable indicator is paint and said detector means is a camera and associated image processor.

* * * * *